United States Patent [19]
Jalink, Jr.

[11] 3,714,432
[45] Jan. 30, 1973

[54] INFRARED HORIZON LOCATOR

[75] Inventor: Antony Jalink, Jr., Newport News, Va.

[73] Assignee: The United States of America as represented by the Administrator of the National Aeronautics and Space Administration

[22] Filed: May 26, 1971

[21] Appl. No.: 146,935

[52] U.S. Cl............................250/83.3 H, 250/231
[51] Int. Cl..............................................G01t 1/16
[58] Field of Search.................................250/83.3 H

[56] References Cited

UNITED STATES PATENTS

| | | |
|---|---|---|
| 3,495,085 | 2/1970 | Knight............................250/83.3 H |
| 3,418,478 | 12/1968 | Falbel............................250/83.3 H |
| 3,576,999 | 5/1971 | Blythe............................250/83.3 H |
| 3,569,710 | 3/1971 | Jalink............................250/83.3 H |

Primary Examiner—James W. Lawrence
Assistant Examiner—Harold A. Dixon
Attorney—Howard J. Osborn, William H. King and John R. Manning

[57] ABSTRACT

A precise method and apparatus for locating the earth's infrared horizon from space that is independent of season and latitude. First and second integrations of the earth's radiance profile are made from space to earth with the second delayed with respect to the first. The second integration is multiplied by a predetermined constant R and then compared with the first integration. When the two are equal the horizon is located.

10 Claims, 5 Drawing Figures

INVENTOR.
ANTONY JALINK, JR.

INFRARED HORIZON LOCATOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to infrared (IR) horizon detectors and more specifically concerns a precise method and apparatus for locating the earth's IR horizon from space that is substantially in dependent of season and latitude.

A simple method to determine spacecraft attitude in earth orbit is to sense the atmospheric radiation gradient at opposite sides of the earth's disk, so that the bisector of the included angle points to the nadir, and local vertical is known. The accuracy of this horizon sensing scheme depends, of course, strongly on the stability of the located radiation gradient with respect to the solid earth. For this reason, the choice of the spectral intervals used to sense the gradient is important. More than a decade of experiments and analytical studies points to the $CO_2$ absorption band centered about 15 $\mu$m as optimum for horizon sensing.

Present sensors for locating the earth's IR horizon, called locators, provide information to an accuracy of roughly 1.5 km at the horizon if compensations for latitude and seasonal effects are made. Certain normalization procedures in locating the horizon tend to reduce these latitude and seasonal effects. However, it is desirable that these effects be further reduced. It is therefore the primary purpose of this invention to provide a method and apparatus for locating the earth's IR horizon that has a high level of accuracy, that is lightweight and reliable and that is not substantially influenced by latitude and seasonal effects.

SUMMARY OF THE INVENTION

In this invention the ratio of integrated radiance under the earth's horizon IR radiance profile for two altitudes separated by a fixed increment is used to define the IR horizon. The sensor that constitutes this invention searches for the altitude where a fixed ratio exists between two radiance integrals each having different limits of integration. The integrals have the general form:

$$\int_{h_0}^{h_1} N(h)dh$$

where $h_0$ and $h_1$ are the tangent heights between which the integration is carried out, and $N(h)$ is the radiance of the earth's atmosphere as a function of tangent height. The two integrals that make up the ratio have space, that is the tangent height where $N(h)$ is zero, as their lower limit of integration. The upper limit of integration is a different tangent height for each integral. The locator is satisfied when one integral is a prechosen multiple of the other as expressed by:

$$\int_{\infty}^{h_2} N(h)dh = R \int_{\infty}^{h_3} N(h)dh$$

where $R$ as well as $h_2$ and $h_3$ are chosen such that maximum stability of the locator is obtained. Because $N(h)$ is the same function in both integrals it is clear that choosing the separation $h_2 - h_3 = \Delta h$ is the same as choosing the location of $h_2$ and $h_3$.

The apparatus includes two radiometers with each having a different field of view. A scanning mechanism is included which cause the two fields of view to scan simultaneously from space into the earth's horizon. The leading edge of one field of view is offset with respect to the leading edge of the other by a distance equal to $h_2 - h_3 = \Delta h$. Both fields of view are made large enough in the vertical direction so that their trailing edge will remain above the sensible atmosphere as the fields of view are swept into the horizon. In this manner signals proportional to the integrals:

$$\int_{\infty}^{h_2} N(h)dh \text{ and } \int_{\infty}^{h_3} N(h)dh$$

are produced at the outputs of the radiometers. The output of the radiometer with the lagging field of view is multiplied by $R$ and the resulting signals compared. When they become equal the horizon is located. From angle pickoffs mounted on the scanning mechanism the direction to the horizon can then be read out. A horizon located in this manner is substantially independent of latitude and seasonal effects.

DETAILED DESCRIPTION OF THE INVENTION

Figure 1:
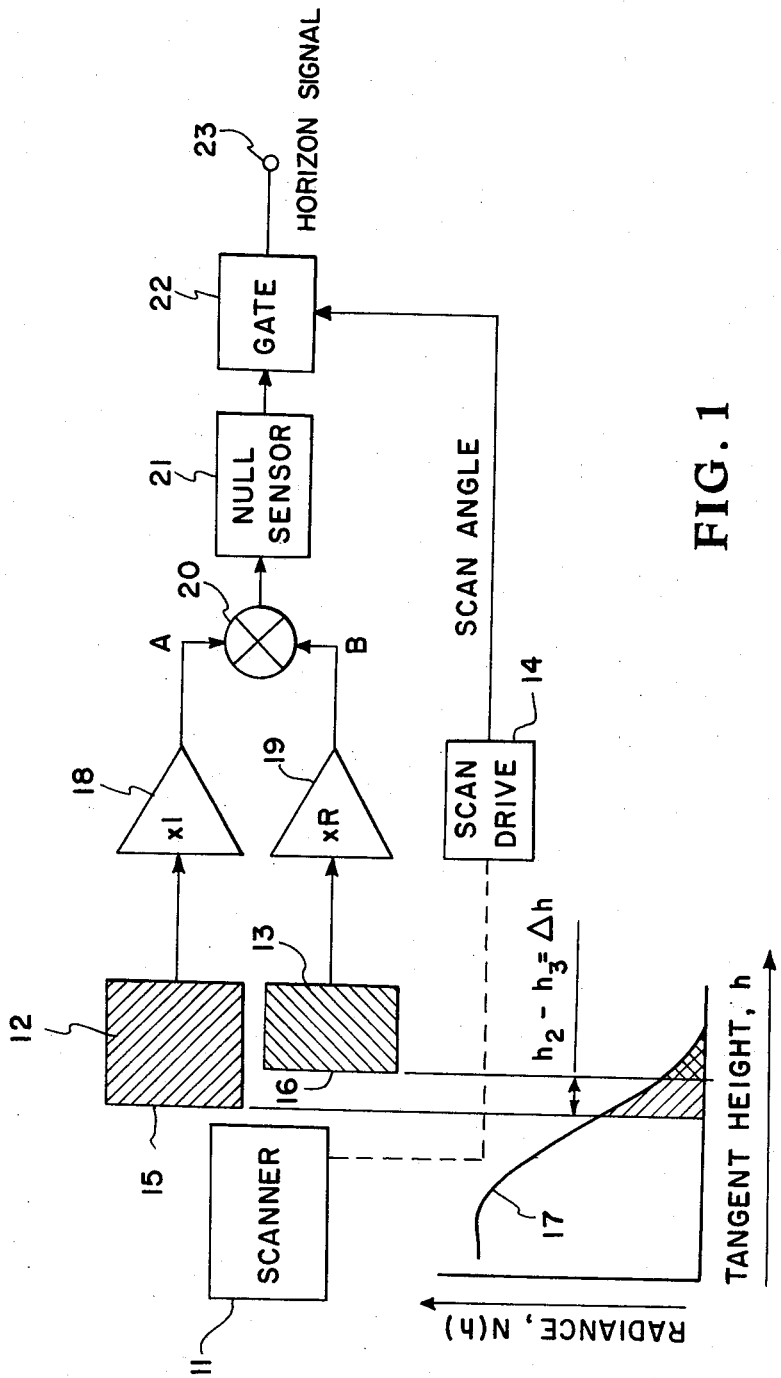
FIG. 1 is a schematic drawing of the invention.

Turning now to the embodiment of the invention selected for illustration in the drawings the number 11 in FIG. 1 designates a scanner having two fields of view 12 and 13. Scanner 11 is in orbit about the earth and is driven by a scan drive 14 such that fields of view 12 and 13 both scan from space to earth with the leading edge 15 of field of view 12 leading the leading edge 16 of field of view 13 by a prechosen and fixed amount $\Delta h$. Scan drive 14 also produces an electrical signal that is indicative of the angle through which scanner 11 has scanned at any given instant. Curve 17 is a plot of radiance $N(h)$ versus tangent height $h$. That is, curve 17 represents the radiation "seen" by a radiometer when viewing from space a point a distance of $h$ above the horizon. As fields of view 12 and 13 scan from space they scan the radiance as represented by curve 17 from right to left. Each scan made by scanner 11 is such that the trailing edges of fields of view 12 and 13 are always in space. Consequently, the radiation "seen" by either of the fields of view 12 and 13 at any given instant is the radiance under curve 17 from the leading edge of the field of view back to space. Hence, the radiation "seen" by either field of view at any given instant is equal to the integration of the radiation from space to the leading edge of the field of view. Scanner 11 provides means for producing electrical signals proportional to the radiation "seen" by fields of view 12 and 13. The details of scanner 11 are disclosed in FIG. 2.

The signal proportional to the radiation in field of view 12 is amplified by an amplifier 18, and the signal proportional to the radiation in fiew of view 13 is amplified by an amplifier 17 having R times the gain of amplifier 18. The signal at the output of amplifier 18 is compared with the signal at the output of amplifier 18 by a comparator 20. When these two signals are equal the resulting zero output from comparator 20 causes a null sensor 21 to produce a signal that allows the scan angle signal from scan drive 14 to pass through a gate 22 to the output terminal 23. This signal on the output terminal 23 indicates the location of the horizon.

Figure 2:
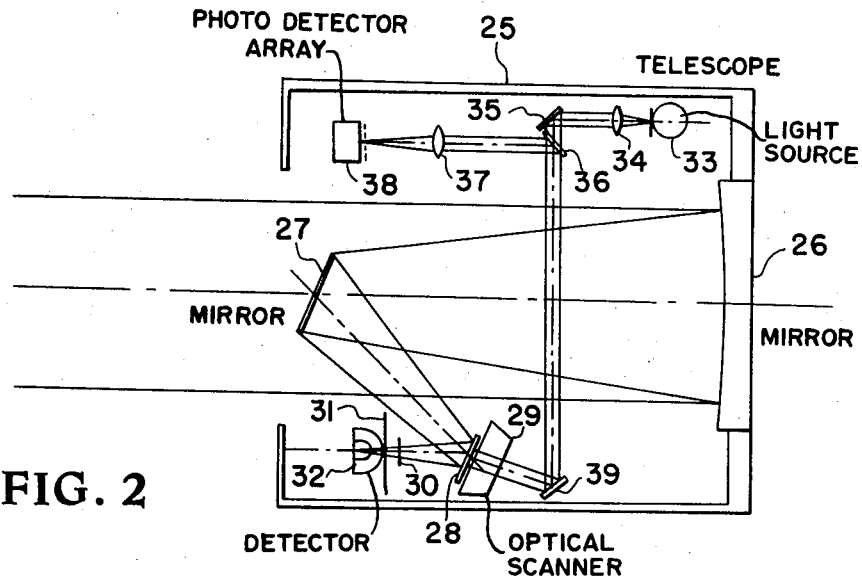
FIG. 2 is a schematic drawing of the optical scanning apparatus used in this invention.

Referring now to FIG. 2 there is shown in more detail a schematic drawing of the scanner 11 and scan drive 14 in FIG. 1. A telescope 25 located in space views the horizon through its spherical objective mirror 26. Part of the energy reflected by mirror 26 is reflected by a Newtonian folding mirror 27 onto a scanning mirror 28 of a mechanically resonant optical scanner 29. In this device, a taut ribbon delivers the restoring force for the oscillating scan mirror, with the frequency of oscillations determined by the moment of inertia of the moving parts and the elasticity constant of the taut band. Conventional bearings and their lubrication problems are absent, and the small magnetic drive coils which start and maintain the oscillations consume very little power (typically less than 10 milliwatts). If the scan mirror were placed in front of the telescope, its size would be prohibitively large for use with a resonant optical scanner. This problem is circumvented when the mirror is placed in the convergent energy beam between the telescope objective and the focal plane as shown in FIG. 2. The energy reflected by mirror 28 passes through a band pass filter 30 and a field stop 31 onto a detector 32. Field stop 31 and detector 32 are disclosed in more detail in FIG. 3.

The remaining apparatus in FIG. 2 is a digital mirror angle readout subsystem which indicates the direction to the located horizon with respect to the spacecraft. Light from a slit-shaped light source 33 is collimated by a collimating lens 34 and then reflected by a folding mirror 35 through a beam splitter 36 and by a folding mirror 39 onto the back surface of scan mirror 28. The reflected beam is reflected by folding mirror 39 and beam splitter 36 and then passes through converging lens 37 onto an array of photodetectors 38. The photodetector 38 that the beam strikes is indicative of the position of scan mirror 28 relative to the spacecraft.

Figure 3:
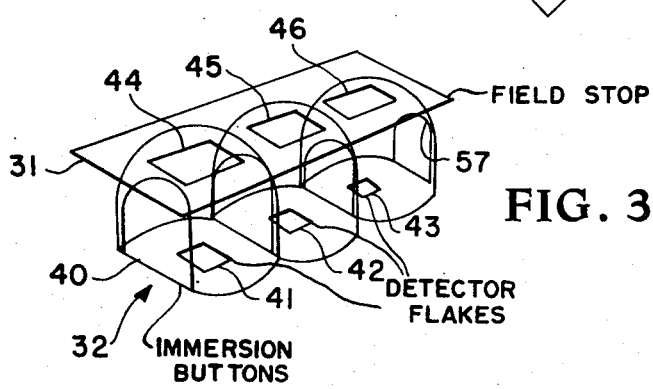
FIG. 3 is a schematic drawing of the field stop 31 and detector 32 in FIG. 2.

Referring now to FIG. 3, detector 32 in FIG. 2 includes immersion buttons 40 with thermistor detector flakes 41, 42 and 43, hyper immersed in germanium so that the immersion lenses provide a magnification of 5.3. Field stop 31 is located immediately in front of detector 32 such that openings 44, 45 and 46 are directly over detector flakes 41, 42 and 43, respectively. The immersion lenses act as field lenses; they re-image the telescope aperture on the detector flakes. Opening 45 in field stop 31 corresponds to field-of-view 12 in FIG. 1, and openings 44 and 46 correspond to field-of-view 13. With this arrangement each of the openings 44 and 46 can be made ½R times as wide as opening 45 thereby eliminating the need for amplifiers 18 and 19 in FIG. 1. Obviously if openings 44 and 46 are ½R times as wide as opening 45 then thermistor flakes 41 and 43 each have to be ½R times as wide as thermistor flake 42.

Figure 4:
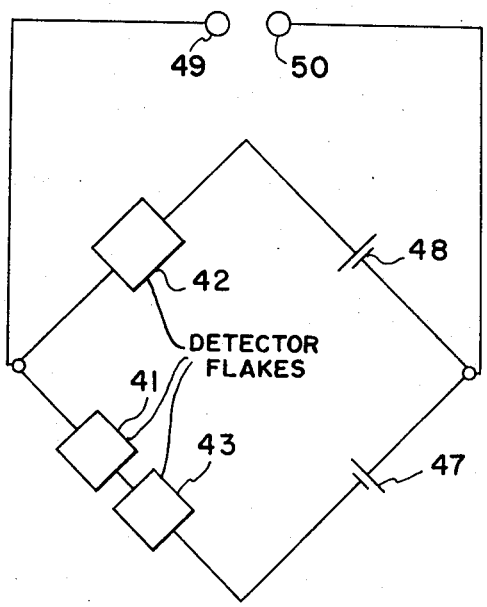
FIG. 4 is a schematic drawing of the comparator 20 in FIG. 1.

Thermistor flakes 41, 42 and 43 are connected in a bridge circuit as shown in FIG. 4. A battery 47 is located in the arm of the bridge opposite flake 42 and a battery 48 is located in the arm of the bridge opposite flakes 41 and 43. The voltage across battery 47 is $R$ times the voltage across battery 48. The output of the bridge circuit is across terminals 49 and 50 which are connected to the null sensor 21. This bridge circuit performs the functions of amplifiers 18 and 19, and comparator 20.

Figure 5:
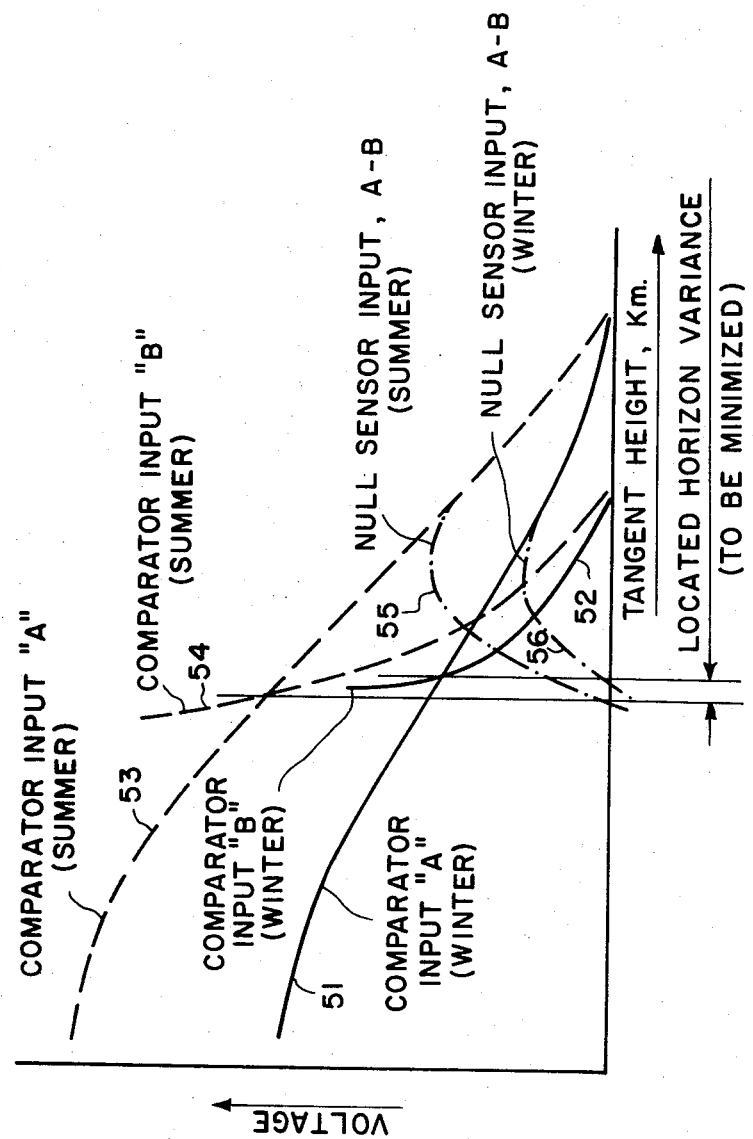
FIG. 5 is a set of curves illustrating the principle of detection used by this invention.

FIG. 5 is a graph showing the principle of detection in the present invention. The solid line curves 51 and 52 show the comparator 20 inputs A and B, respectively, for winter condition, and the dashed-line curves 53 and 54 show the comparator 20 inputs A and B, respectively, for summer conditions. The dash-dot-line curves 55 and 56 represent the outputs of comparator 20 for summer and winter conditions, respectively. Where curves 55 and 56 cross the zero-volt line the null sensor 21 signals the location of the horizon. The values of $\Delta h$ and of $R$ should be chosen such that curves 55 and 56 cross the zero-volt line at a steep angle and at as much as possible the same tangent altitude, for the most stable and accurate horizon location. The value of $\Delta h$ will be between 5 and 30 km in a practical system and most likely be about 17.5 km. The value of $R$ will be between 1.5 and 5 with 4.65 being the most likely value.

In the operation of this invention, scanning mirror 28 of optical scanner 29 is rotated such that it scans from space into the horizon. The reflected energy from mirror 28 is blocked by field stop 31 until the reflected energy reaches the leading edge 57 of opening 45 at which time the reflected energy begins to strike flake 42. As the reflected energy continues to scan across field stop 31 it reaches the leading edges of opening 44 and 46, and strikes flakes 41 and 43. The resulting changes in resistance of flakes 41, 42 and 43 eventually balances the bridge in FIG. 4 and at this point the horizon is located. The zero voltage across terminals 49 and 59 when the bridge is balanced is detected by the null sensor and gate 22 is opened allowing the signal on photodetectors 38 to pass through the gate to output terminal 23. The signal on output terminal 23 is indicative of the location of the horizon.

The advantage of this invention is that it provides a precise method and apparatus for locating the earth's IR horizon from space that is substantially independent of latitude and seasonal effects.

It is to be understood that the form of the invention herewith shown and described is to be taken as a preferred embodiment. Various changes may be made without departing from the spirit and scope of the invention as defined in the claims. For example, instead of using an area scan, a point or line scan could be made and the outputs of the scanning means integrated. Also different scanning means, amplifier means and comparator means than those shown could be used.

What is claimed as new and desired to be secured by Letters Patent of the United States is:

1. A method for locating the earth's horizon from a spacecraft comprising the steps of:

providing a first integration of the IR radiance profile of the earth's horizon from space to earth with the lower limit of said first integration being a point in space where the radiation is approximately zero and with the upper limit of said first integration being continuously changing from space to earth;

providing simultaneously with said first integration, a second integration of the IR radiance profile of the earth's horizon from space to earth, said second integration having the same lower limit as said first integration and having an upper limit that lags the upper limit of said first integration by a prechosen distance $\Delta h$;

multiplying said second integration by a predetermined constant $R$ greater than 1; and comparing said first integration with said second integration multiplied by $R$ whereby when the two compared values are equal the upper limit of said first integration is indicative of the location of the earth's horizon.

2. A device for locating the earth's IR horizon from space comprising:

first integrating means located in space for integrating from space to earth the earth's IR radiance profile with the lower limit of said first integration being a point in space where the radiation is approximately zero;

second integrating means located in space adjacent said first integrating means for integrating from space to earth the earth's IR radiance profile with the lower limit of said second integration being said point in space where the radiation is approximately zero;

said first and second integrating means including means for making the integrations by the two integrating means simultaneously with the upper limits of the two integrations continuously changing but with the upper limit of the integration by the second integrating means lagging the upper limit of the integration by the first integrating means a prechosen vertical distance $\Delta h$; and means for determining at what point in the integration by said first integrating means that the output of said first integrating means is equal to the output of said second integrating means times a predetermined constant $R$ greater than one whereby said point identifies the location of the earth's IR horizon.

3. A device for locating the earth's IR horizon from space according to claim 2 wherein said first and second integrating means includes an optical scanning means having at least two adjacent fields of view with the field of view associated with said first integrating means leading the fields of view associated with said second integrating means.

4. A device for locating the earth's IR horizon from space according to claim 3 wherein the end of each scan by said scanning means is such that the trailing edges of all of said fields of view are viewing space at all times.

5. A device for locating the earth's IR horizon from space according to claim 4 wherein said fields of view associated with said second integrating means consists of two equal fields of view located on opposite sides of said first field of view.

6. A device for locating the earth's IR horizon from space according to claim 5 wherein each of said two equal fields of view located on opposite sides of said first field of view are $\frac{1}{2}R$ times as wide as said first field of view.

7. A device for locating the earth's IR horizon from space according to claim 6 wherein each of said fields of view includes an opening in a field stop through which radiance is projected by said optical scanning means.

8. A device for locating the earth's IR horizon from space according to claim 7 wherein a thermistor flake, that changes resistance in accordance with the radiation that strikes it, is placed back of each of said openings such that it intercepts all radiation that passes through the opening.

9. A device for locating the earth's IR horizon from space according to claim 8 wherein the two thermistor flakes located back of said openings corresponding to the fields of view associated with said second integrating means are connected in a bridge circuit opposite a battery having V volts and the thermistor flake located back of said opening corresponding to the field of view associated with said first integrating means is connected in said bridge circuit opposite a battery having RV volts whereby when said bridge becomes balanced the point in the first integration is indicative of the location of the earth's IR horizon.

10. A device for locating the earth's IR horizon according to claim 9 including means for producing a signal indicative of the positions of said optical scanning means and means responsive to a zero voltage output from said bridge for gating said signal to a terminal.

* * * * *